United States Patent

[11] 3,620,581

| [72] | Inventors | Stanley Heller<br>Philadelphia;<br>Wilbur Shapiro, Huntington Valley, both of Pa. |
|---|---|---|
| [21] | Appl. No. | 79,785 |
| [22] | Filed | Oct. 12, 1970 |
| [45] | Patented | Nov. 16, 1971 |
| [73] | Assignee | The United States of America as represented by the Secretary of the Air Force |

[54] POROUS HYDROSTATIC BEARING
10 Claims, 3 Drawing Figs.

[52] U.S. Cl. .................................................. 308/9
[51] Int. Cl. ............................................... F16c 17/16
[50] Field of Search .......................................... 308/9, 73, 122

[56] References Cited
UNITED STATES PATENTS
2,645,534  7/1953  Becker .......................... 308/9

Primary Examiner—Martin P. Schwadron
Assistant Examiner—Frank Susko
Attorneys—Harry A. Herbert, Jr. and Jacob N. Erlich ABSTRACT: A porous hydrostatic bearing having self-lubricating bearing pads mounted in a plurality of adjustably mounted bearing shoes. The use of such a bearing in conjunction with the gas source taking the form of the system working medium allows for the use of this bearing in a cryogenic atmosphere.

PATENTED NOV 16 1971 3,620,581

INVENTORS
STANLEY HELLER,
WILBUR SHAPIRO
BY Harry A. Herbert Jr.
Jacob N. Ehrlich and
ATTORNEYS

3,620,581

POROUS HYDROSTATIC BEARING

BACKGROUND OF THE INVENTION

This invention relates generally to bearings, and more particularly to a porous hydrostatic bearing capable of functioning at extremely low temperatures.

It has been found that there are many advantages in cryogenics for improving sensitivity and response of certain electrical and electronic devices. Therefore, it becomes extremely necessary to improve the life and reliability of the various cryogenic refrigeration components. For example, in miniature cryogenic turbomachinery applications, high rotative speeds are necessary in order to obtain the required amount of refrigeration. Both life and viscous power losses of conventional shaft bearings in a cryogenic environment as in many other types of extreme temperature conditions are often prohibitive. Because of high speeds and the limiting damping properties of gas in a cryogenic environment, fractional frequency whirl can be prevalent and a difficult problem to overcome.

SUMMARY OF THE INVENTION

The porous, hydrostatic bearing of this invention overcomes the problems heretofore in existence. The present invention is made up of a three shoe bearing, with each shoe lapped to a shaft size slightly larger than the shaft with which it is utilized. The radial position of each shoe is adjustable by means of differential adjusting screws. The screws are hollow and have tube fittings at their ends to provide connections for the supply gas used with this invention. Within each of these shoes is located a porous graphitar pad shaped to the shaft or journal configuration and having additional holes therein to aid in the distribution of the gas.

In cryogenic refrigeration components, the working medium is usually in the form of gaseous nitrogen, argon or helium and it therefore becomes efficient to use these gases in the bearing system of this invention. By the utilization of this working medium, it is possible to eliminate many of the problems now in existence resulting from the contamination of the working medium by other lubricants. This gas in a pressurized state is introduced to each porous pad within the bearing shoes causing a pressure buildup between the shaft and the pad. The pads are forced back against their preloading spring thereby forming a film thickness between the shaft and the pad. Since the material of the pad is self-lubricating the bearing of this invention can operate with very tight film thickness and consequently high stiffness. The hydrostatic flow will aid in cooling the bearing and because of the self-adjusting nature of this configuration small operating film thicknesses are feasible.

It is therefore an object of this invention to provide a porous hydrostatic bearing which is capable of use on metal turbomachinery, especially in the cryogenic field.

It is another object of this invention to provide a porous hydrostatic bearing which has an elastic mounting to contribute to the bearing stability.

It is still another object of this invention to provide a porous hydrostatic bearing which is self-lubricating.

It is a further object of this invention to provide a porous hydrostatic bearing which utilizes the working fluid of the system in which it is incorporated for its gas source.

It is still a further object of this invention to provide a porous hydrostatic bearing which is economical to produce and which utilizes conventional currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DESCRIPTION OF THE PREFERRED EMBODIMENT

Figure 1:
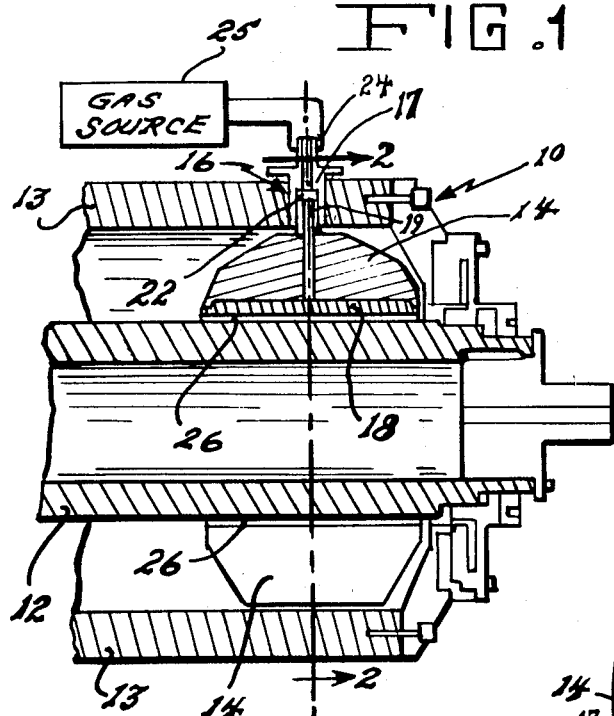
FIG. 1 is a side-elevational view, shown partly in cross section of the porous hydrostatic bearing of this invention utilized in conjunction with a rotatable shaft.
Figure 2:
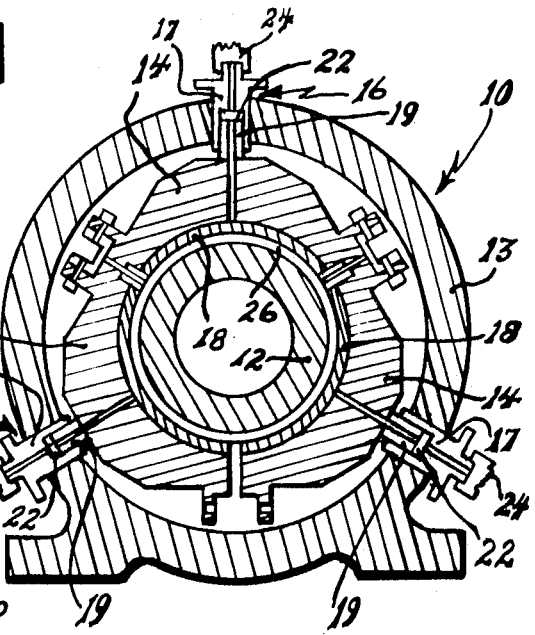
FIG. 2 is a side-elevational view of the porous hydrostatic bearing of this invention taken along line 2—2 of FIG. 1.

Reference is now made to FIG. 1 and 2 of the drawing which best illustrates the porous hydrostatic bearing 10 of this invention. The bearing 10 of the instant invention finds its utility as a bearing member in conjunction with a conventional shaft 12 in any type of machinery. However, it is especially useful in machinery in the cryogenic environment.

The bearing 10 of this invention is made of a housing 13 containing therein a plurality of adjustably mounted bearing shoes 14. For optimum results, however, the bearing 10 of this invention uses three bearing shoes 14, with each shoe 14 being held in radial position by an adjustable securing means, such as differential adjusting screws 16 to be explained in detail herein below. The bearing shoes 14 are lapped to a size slightly larger than the shaft 12 and each shoe 14 has mounted therein a porous bearing pad 18 which lies adjacent the shaft 12.

Figure 3:
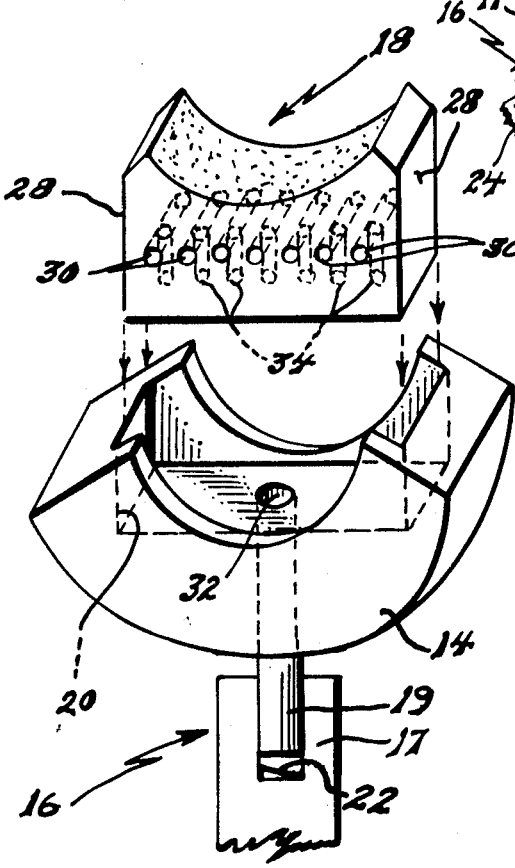
FIG. 3 is a pictorial view of the bearing shoe and pad of the porous hydrostatic bearing of this invention shown in exploded fashion.

Referring to FIG. 3, it is shown in pictorial fashion that each bearing shoe 14 has a cutout section 20 therein in which the bearing pad 18 is securely mounted by any suitable adhesive. The pads 18 are made of any suitable porous material, such as graphitar. Graphitar is self-lubricating material which can operate with very small film thickness because it can withstand high speed rubs without difficulty. By utilizing the sector pads 18 of this invention the difficulties associated with manufacturing close-clearance bushings are avoided and final dimensions are easily obtained by lapping the bearing shoes 14 to a master shaft 12. The stiffness of each of the floating bearing shoes 14 is governed by the stiffness of a backup spring 22. These backup springs 22 may take the form of Belleville washers having a predetermined spring stiffness.

Referring once again to FIG. 1 and 2, each bearing shoe 14 with pad 18 in place is adjustably mounted within an outer housing 13 by means of the differential adjusting screw 16, a member 17 of which provides a precision cylinder fitted to the guide piston 19 of the bearing shoe 14. The member 17 of the differential screw 16 has a tube fitting 24 at its end to provide connection to a gas source 25. The springs 22 are each positioned inside the guide cylinder 17 in the adjusting screws 16, respectively, so as to exert suitable compression on the bearing shoes 14, through the guide piston 19. The stiffness of each of the floating bearing shoes 14 is governed by the stiffness of the backup spring 22.

Referring again to FIG. 3, to assure that sufficient gas flow finds its way into the bearing clearance space 26 (see FIGS. 1 and 2) between the bearing pads 18 and the shaft 12, it is necessary to prevent any gas from escaping the ends 28 of the porous pads 18. This is accomplished by coating the ends 28 with a suitable epoxy resin, such as Eastman 910. To further assure that the pads 18 have a film thickness or bearing clearance 26 between the pads 18 and the shaft 12, and so that the shaft 12 will float freely upon pressurization of the bearing 10 of this invention, it is necessary to minimize the ratio of the pad thickness to the pad surface area. In other words, it is necessary to reduce the pressure drop through the pressure pad 18. To accomplish this, holes 30 are drilled through the sides of the pads 18 in an axial direction. These axial holes are connected to a common plenum chamber 32 in the bearing shoe 14 by drilling perpendicular holes 34 that intersect each of the axial holes. When the pad 18 is in place in the bearing shoe 14, the axially drilled holes 30 are covered and sealed so that all the gas must flow through the bearing film 26 to escape to the atmosphere.

The gas source 25 utilized with the bearing 10 of this invention for most efficient operation takes the form of the working medium of a suitable cryogenic refrigeration system and is in the form of gaseous nitrogen, argon or helium. By the utilization of the working medium as the pressurized gas source 25, it is possible to overcome the contamination of the working medium by other lubricants.

MODE OF OPERATION

In operation, pressurized gas is introduced from source 25 through the tube fittings 24 at the end of the hollow screws 16 and flows to the porous bearing pads 18 causing a pressure buildup between the shaft 12 and the pads 18. The bearing pads 18 along with the bearing shoes 14 are forced back against the preloaded springs 22, respectively, which forms a film thickness 26 between the shaft 12 and the bearing pads 18. The self-lubricating material of the bearing pads 18 allow for the bearing 10 of this invention to operate with a very tight film thickness 26 and consequently high stiffness. The hydrostatic flow of gas will aid in cooling the bearing 10 of this invention. Furthermore, the self-adjusting nature of the configuration of this invention allows for the extremely small film thickness 26 between the pads 18 and the shaft 12. It is the utilization of the porous hydrostatic bearing 10 of this invention which incorporates therein the operating fluid as a pressurized gas source 25 that allows the bearing 10 of this invention to be utilized at any low temperature and therefore to operate extremely reliable in cryogenic turbomachinery applications.

Although the invention has been described with reference to a particular embodiment, it will be understood to those skilled in the art that this invention is also capable of a variety of alternate embodiments within the spirit and scope of the appended claims.

We claim:

1. A porous hydrostatic bearing adapted to be used with a shaft of predetermined diameter comprising a housing, a plurality of bearing shoes adjustably mounted within said housing, a porous bearing pad mounted within each of said shoes and a means for introducing a gas to said bearing pads whereby a small film thickness is produced between the shaft and said bearing pads.

2. A porous hydrostatic bearing as defined in claim 1 wherein said bearing pads are self-lubricating.

3. A porous hydrostatic bearing as defined in claim 2 wherein each of said bearing pads has a plurality of axial holes therein and means connecting each of said axial holes to said gas introducing means.

4. A porous hydrostatic bearing as defined in claim 3 wherein the ends of said bearing pads are sealed.

5. A porous hydrostatic bearing as defined in claim 4 wherein the ends of said axial holes are covered.

6. A porous hydrostatic bearing as defined in claim 5 wherein said gas introducing means is a hollow adjusting screw for adjustably mounting each of said bearing shoes to said housing.

7. A porous hydrostatic bearing as defined in claim 6 wherein said gas takes the form of the working medium of the system associated with said shaft.

8. A porous hydrostatic bearing as defined in claim 7 wherein each of said bearing pads is made of graphitar.

9. A porous hydrostatic bearing as defined in claim 8 wherein said gas is nitrogen.

10. A porous hydrostatic bearing as defined in claim 8 wherein said gas is argon.